(12) United States Patent
Yasukawa

(10) Patent No.: US 12,164,419 B2
(45) Date of Patent: Dec. 10, 2024

(54) INFORMATION PROCESSING APPARATUS AND METHOD OF CONTROLLING INFORMATION PROCESSING APPARATUS

(71) Applicant: CANON KABUSHIKI KAISHA, Tokyo (JP)

(72) Inventor: Takuma Yasukawa, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 76 days.

(21) Appl. No.: 18/062,448

(22) Filed: Dec. 6, 2022

(65) Prior Publication Data

US 2023/0185710 A1 Jun. 15, 2023

(30) Foreign Application Priority Data

Dec. 10, 2021 (JP) ................................ 2021-200577

(51) Int. Cl.
*G06F 12/02* (2006.01)

(52) U.S. Cl.
CPC .. *G06F 12/0246* (2013.01); *G06F 2212/1036* (2013.01); *G06F 2212/7211* (2013.01)

(58) Field of Classification Search
CPC ......... G06F 12/0246; G06F 2212/1036; G06F 2212/7211; G06F 2212/7205
See application file for complete search history.

(56) References Cited

U.S. PATENT DOCUMENTS

| | | | | |
|---|---|---|---|---|
| 2013/0326096 A1* | 12/2013 | Cohen | ................... | G06F 3/0659 710/74 |
| 2018/0129674 A1* | 5/2018 | Kim | ....................... | G06F 16/162 |
| 2021/0405893 A1* | 12/2021 | Agarwal | ................ | G06F 3/0659 |
| 2023/0297246 A1* | 9/2023 | Nagai | ................... | G06F 3/0659 711/154 |

FOREIGN PATENT DOCUMENTS

JP 2015141681 A 8/2015

\* cited by examiner

*Primary Examiner* — Francisco A Grullon
(74) *Attorney, Agent, or Firm* — Canon U.S.A., Inc. IP Division

(57) ABSTRACT

A first size set in a case where a first request including at least discard processing is received from a first application is wider than a second size set in a case where a second request including at least the discard processing is received from a second application different from the first application.

20 Claims, 8 Drawing Sheets

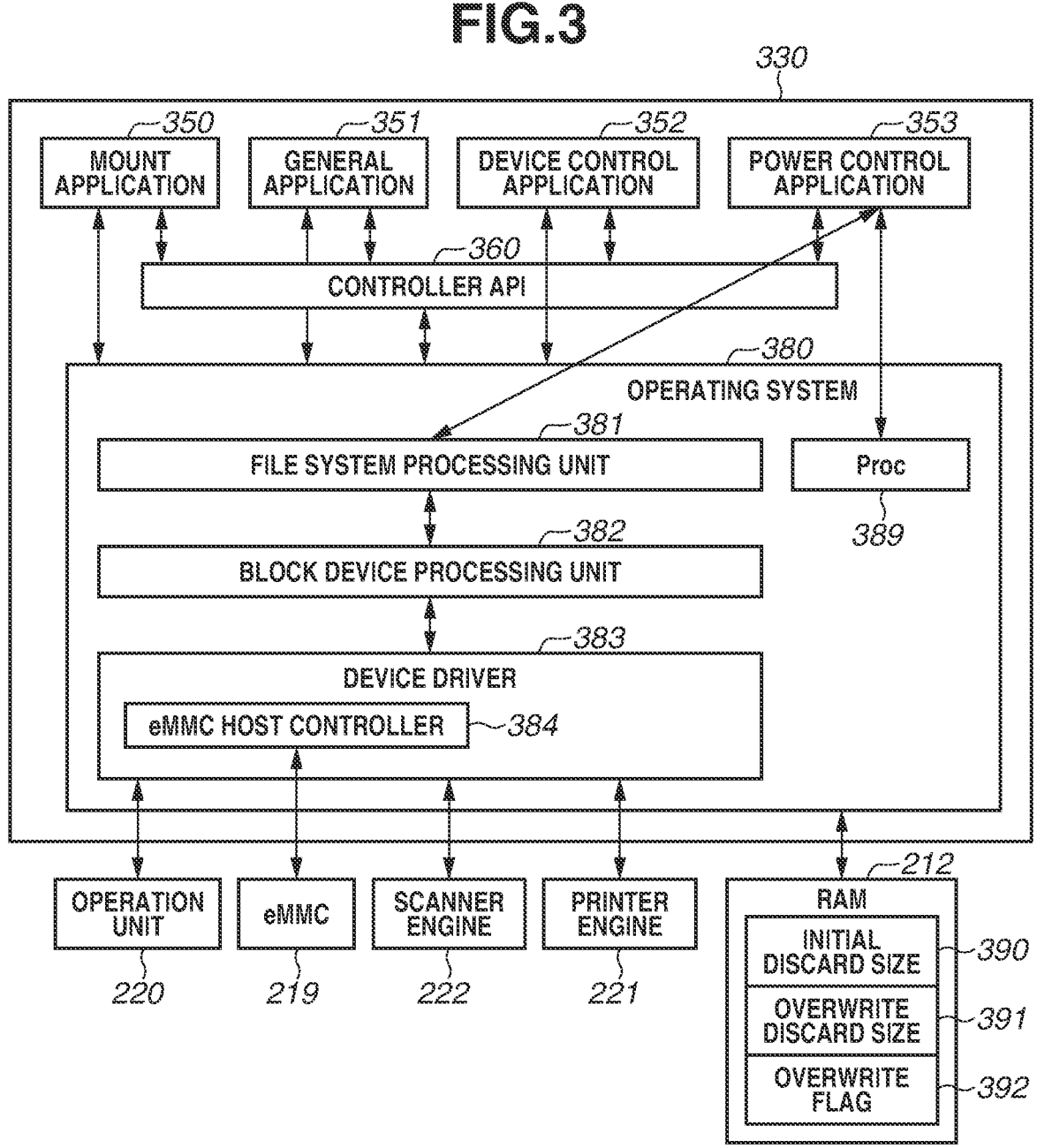

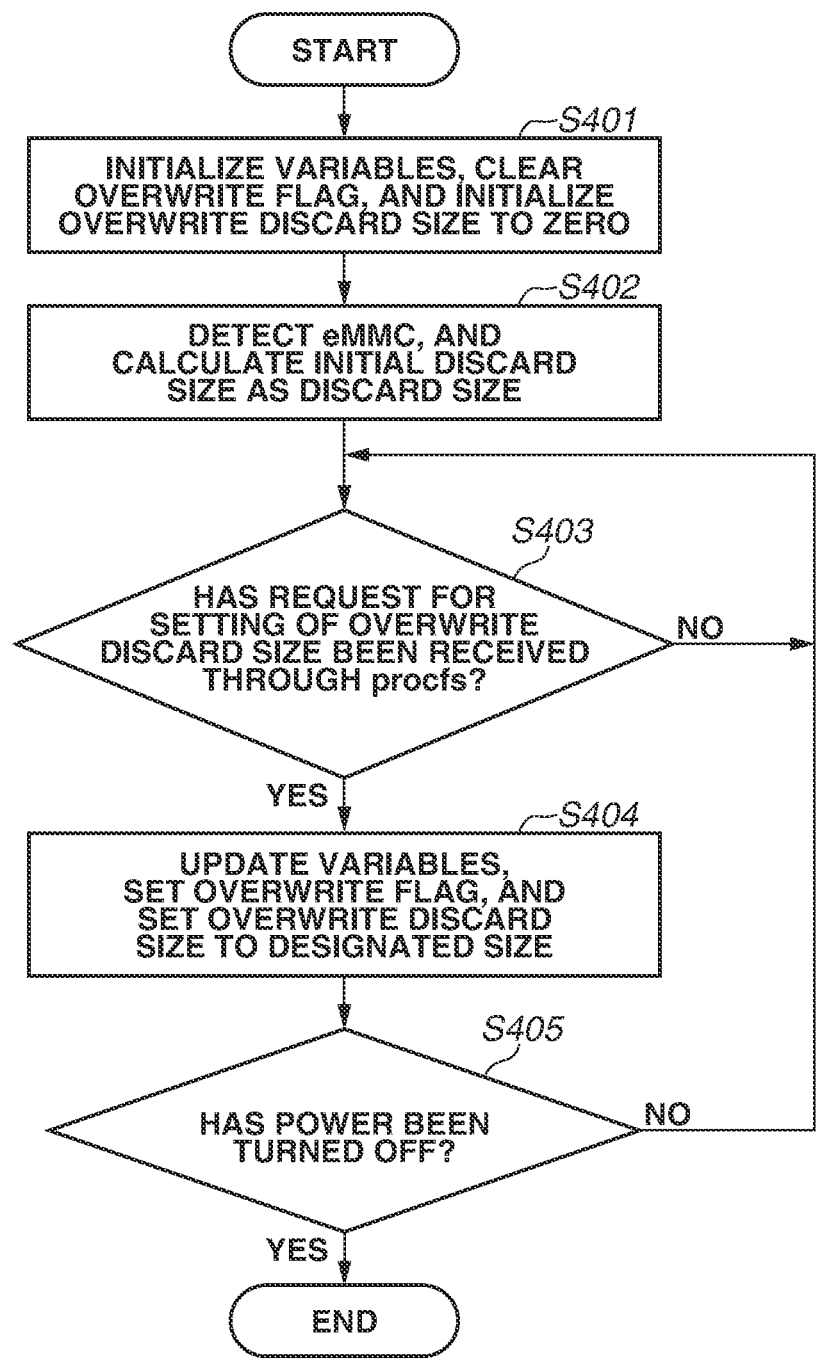

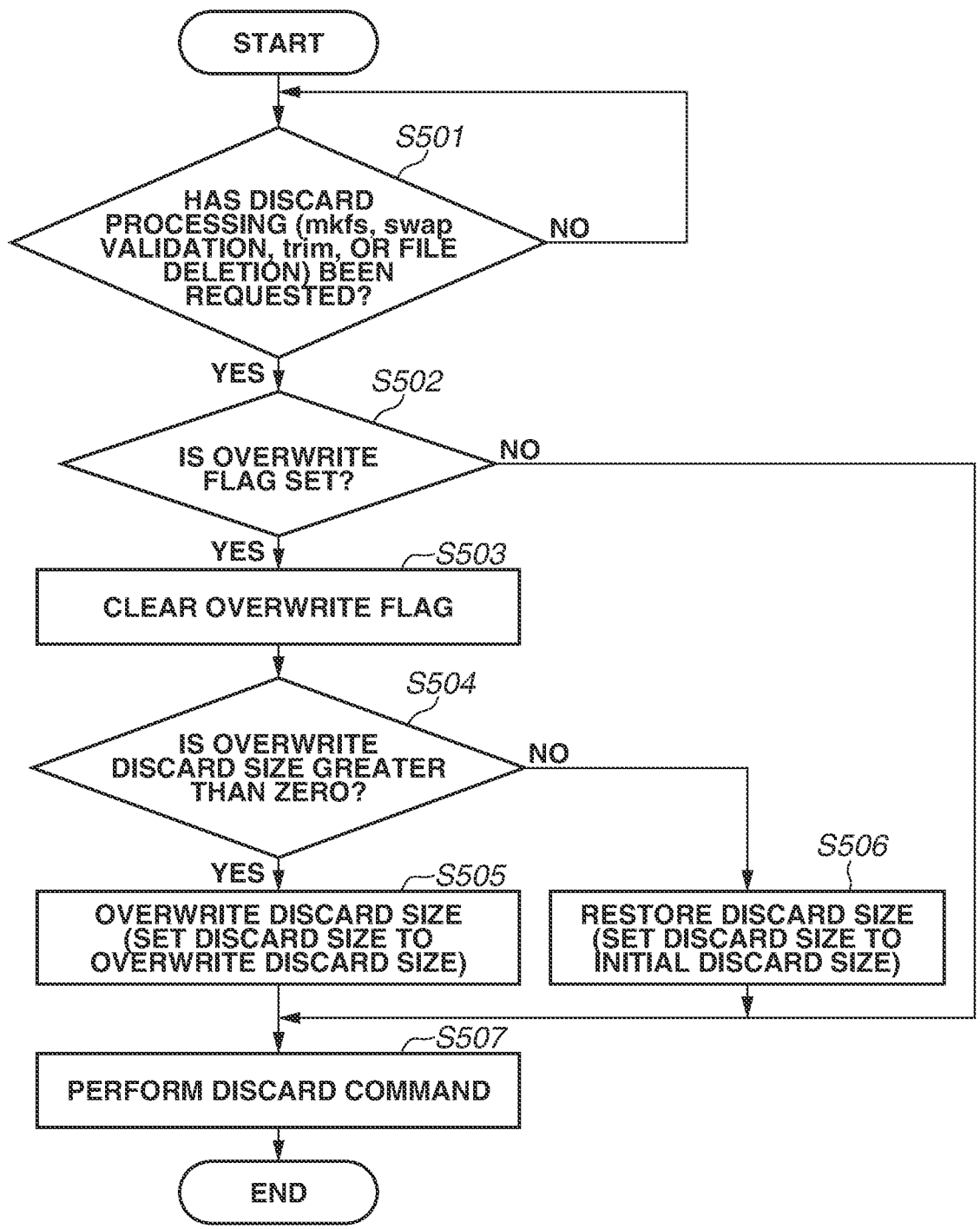

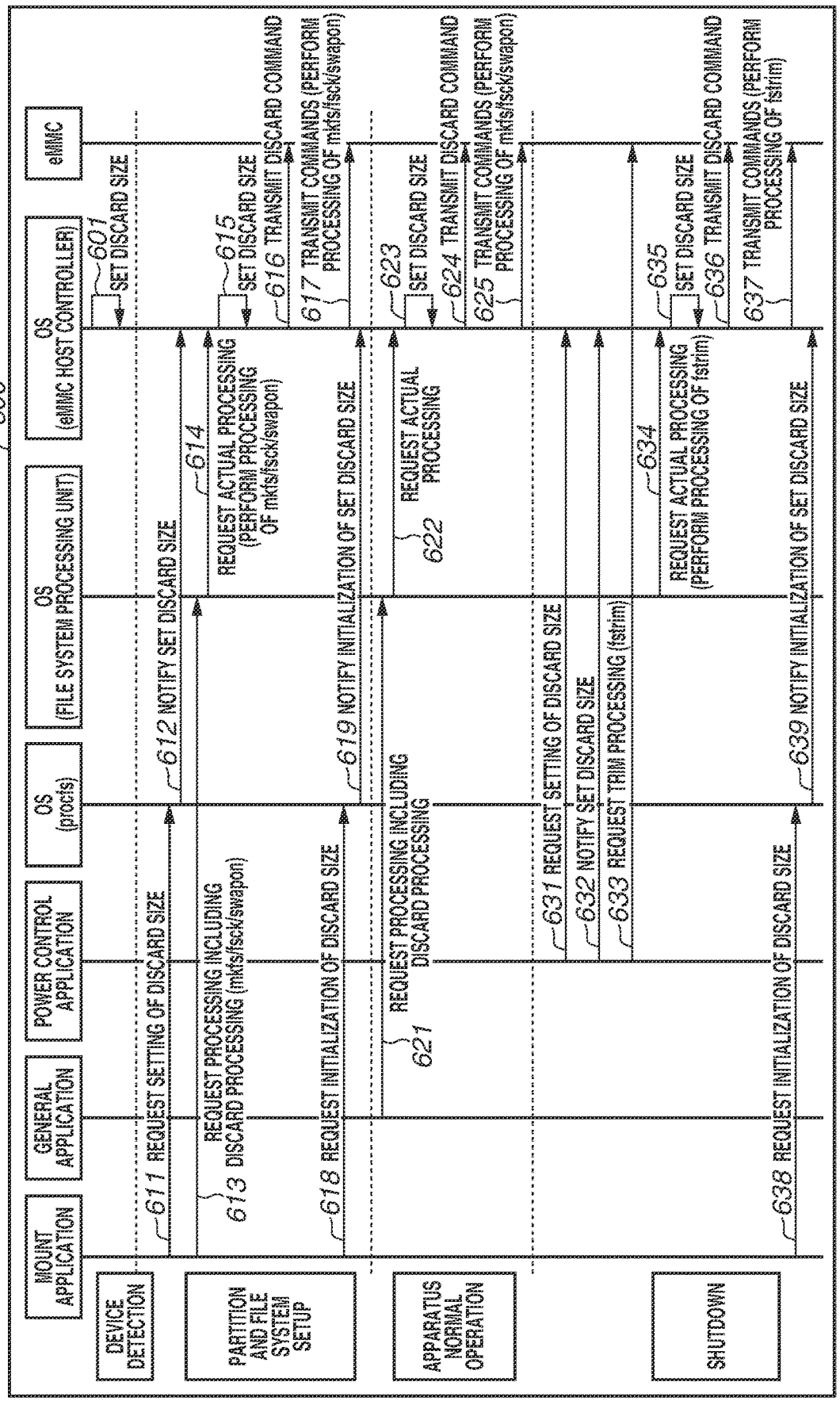

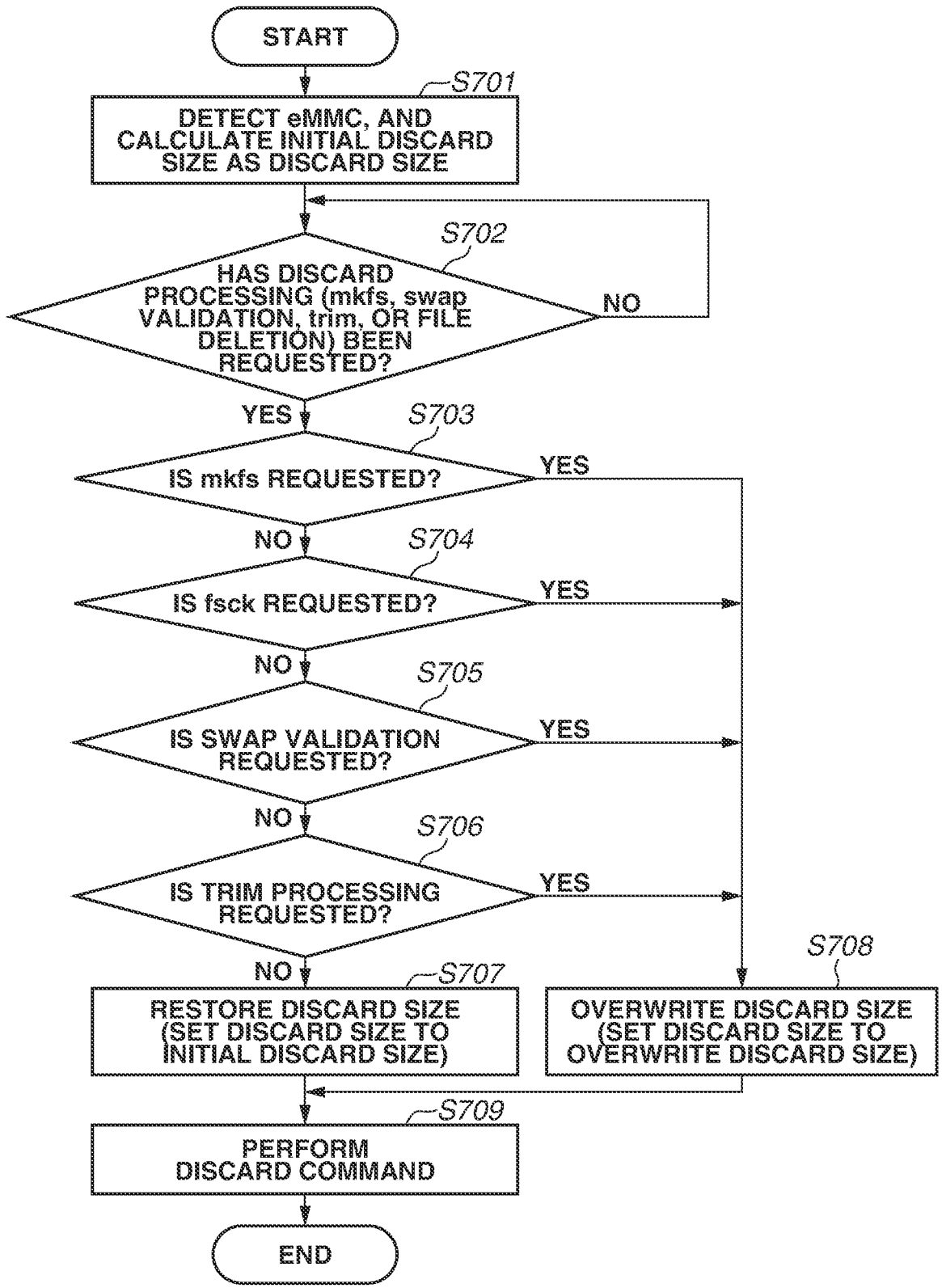

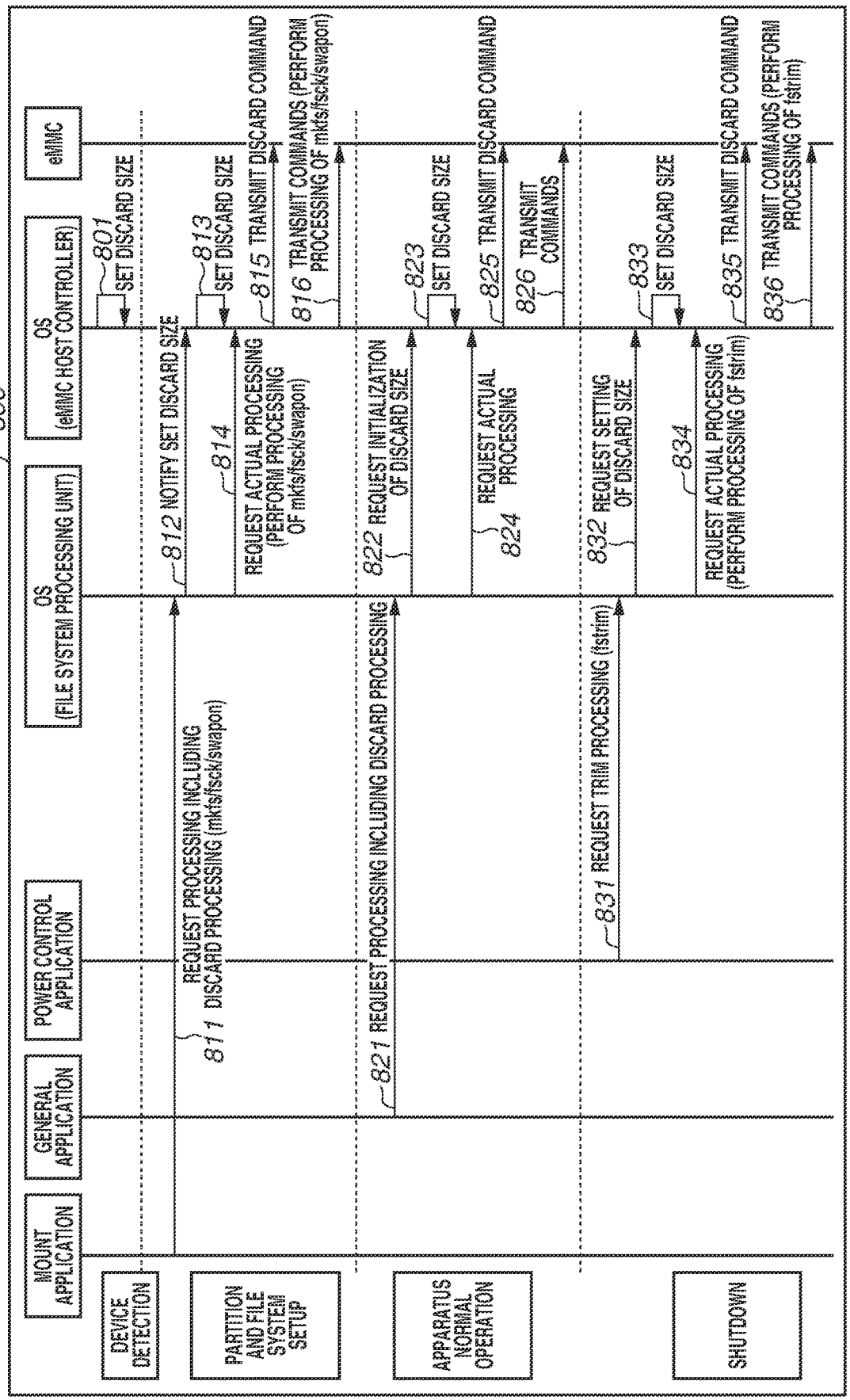

INFORMATION PROCESSING APPARATUS AND METHOD OF CONTROLLING INFORMATION PROCESSING APPARATUS

BACKGROUND

Technical Field

The aspect of the embodiments relates to an information processing apparatus and a method of controlling the information processing apparatus.

Description of the Related Art

In recent years, more and more information processing apparatuses are used that includes a nonvolatile semiconductor storage device using a flash memory such as a solid state drive (SSD) and an embedded multimedia card (eMMC). Such a semiconductor storage device is superior to a hard disk drive (HDD) in terms of access speed, quiet performance, and other items; however, the number of rewriting times is limited. To prolong the service life of a flash memory built-in the semiconductor storage device, a controller included in the semiconductor storage device performs distributed writing called wear leveling. In the wear leveling, writing is performed by replacing blocks to use blocks into which the number of writing times is small as much as possible. As a result, block erasing, data copying, and other operations occur in block replacement in wear leveling on an information processing apparatus, which can deteriorate performance (reading/writing performance) of the semiconductor storage device.

Nonvolatile semiconductor storage devices commonly perform processing called trim to prevent deterioration of the performance. It is a command notifying a storage device of a storage area no longer used by the file system of an operating system (OS). More specifically, the file system receiving a trim command notifies the controller of a semiconductor storage device of an area no longer for use by a discard command through the host controller of an OS.

The controller of a semiconductor storage device can collect areas for use (garbage collection) to perform wear leveling by recognizing unused areas. That allows the controller of the semiconductor storage device to copy a less amount of data, and reduces the number of blocks in use and the total number of rewriting times. Thus, the controller of the semiconductor storage device notifies the semiconductor storage device of the storage areas no longer used with the trim command, which prevents the semiconductor storage device from performing wear leveling processing on the unnecessary areas, and deterioration of the performance.

An issuance timing of a discard command notified to the controller of a semiconductor storage device is not limited to a time when the file system requests trim processing. A nonvolatile semiconductor storage device of an information processing apparatus is divided into units called partitions depending on the use. In most cases, each partition is managed through an appropriate file system. A discard command is notified in format processing on partitions, inspection/repair processing, and swap area validation processing to temporarily save information in a main memory such as a dynamic random access memory (DRAM) in a nonvolatile semiconductor storage device. The format processing corresponds to, for example, "mkfs" on Linux®. The inspection/repair processing corresponds to, for example, "fsck" on Linux®. The swap area validation processing corresponds to, for example, "swapon" on Linux®.

The size of an area processed by a discard command notified from the host controller of an OS to the controller of a semiconductor storage device varies depending on the model number of the eMMC.

For example, with a small size of the area processed by a discard command, the number of times of a discard command notification from the host controller of an OS to the controller of a semiconductor storage device is increased when the discard command notifications are performed for the entire area. This increases the number of times of analyzing the received commands by the host controller, and the number of times of waiting for command completion by a block processing unit that has notified the command. As a result, this takes a longer time until completion of processing of a discard request from an application.

On the other hand, methods of executing a trim command includes a method in which a trim command is issued every writing on a semiconductor storage device in the mechanism of the file system of an OS (successive trim function). The successive trim function is enabled by designating a mount option called "discard" when the partitions of the semiconductor storage device are mounted for use.

The successive trim function allows an application to eliminate the need to issue a trim command at an optional timing, but can slow down the entire operation speed. Further, some OSs and types of file system do not support the successive trim function.

Other than the successive trim function, there is a method in which an application executes an outsourced command "fstrim" that issues trim commands to a semiconductor storage device at optional timings. In this method, the application executes an fstrim command provided by the OS while designating an area of the semiconductor storage device, and the OS checks an unused area in the file system of the designated area and issues a trim command to the semiconductor storage device.

In this method, the application executes the fstrim command at idle or standby, in response to a user instruction, or at a designated time. For example, Japanese Patent Application Laid-Open No. 2015-141681 discusses an apparatus in which an application executes a trim command when determining that it is a state indicating a job interruption depending on the operation such as job execution by the information processing apparatus, and interrupts the trim command in response to the clearance of job interruption.

SUMMARY

According to an aspect of the embodiments, an apparatus includes a storage, the apparatus comprising a controller configured to run a system that transmits a request to the storage, and a plurality of applications stored in the storage that each transmits, to the system, a request including at least discard processing for notifying the storage of an area no longer in use in at least the storage. In response to when the system receives the request including at least the discard processing from any of the plurality of applications, the controller sets a size of a processing area processed by the discard processing, and then transmits an execution instruction of the discard processing corresponding to the setting, to the storage. A first size set in a case where a first request including at least the discard processing is received from a first application is wider than a second size set in a case where a second request including at least the discard processing is received from a second application different from the first application.

Further features of the disclosure will become apparent from the following description of exemplary embodiments with reference to the attached drawings.

BRIEF DESCRIPTION OF THE DRAWINGS

FIG. 3 illustrates the configuration of controller software.

FIG. 4 is a control flowchart of eMMC detection and overwrite discard size setting.

FIG. 5 is a control flowchart in discard request from an application.

FIG. 6 is a sequence diagram illustrating an operation example of the information processing apparatus.

FIG. 7 is a control flowchart in eMMC detection and discard request from an application.

FIG. 8 is a sequence diagram illustrating an operation example of the information processing apparatus.

DESCRIPTION OF THE EMBODIMENTS

Some exemplary embodiments of the disclosure are described in detail with reference to accompanying drawings. The following exemplary embodiments do not limit the disclosure according to the claims, and not all of the combinations of characteristics described in the exemplary embodiments are used as solving means of the disclosure. In the exemplary embodiments, an image processing apparatus is described as an example of an information processing apparatus; however, the information processing apparatus is not limited thereto.

<Description of Apparatus>

Figure 1:
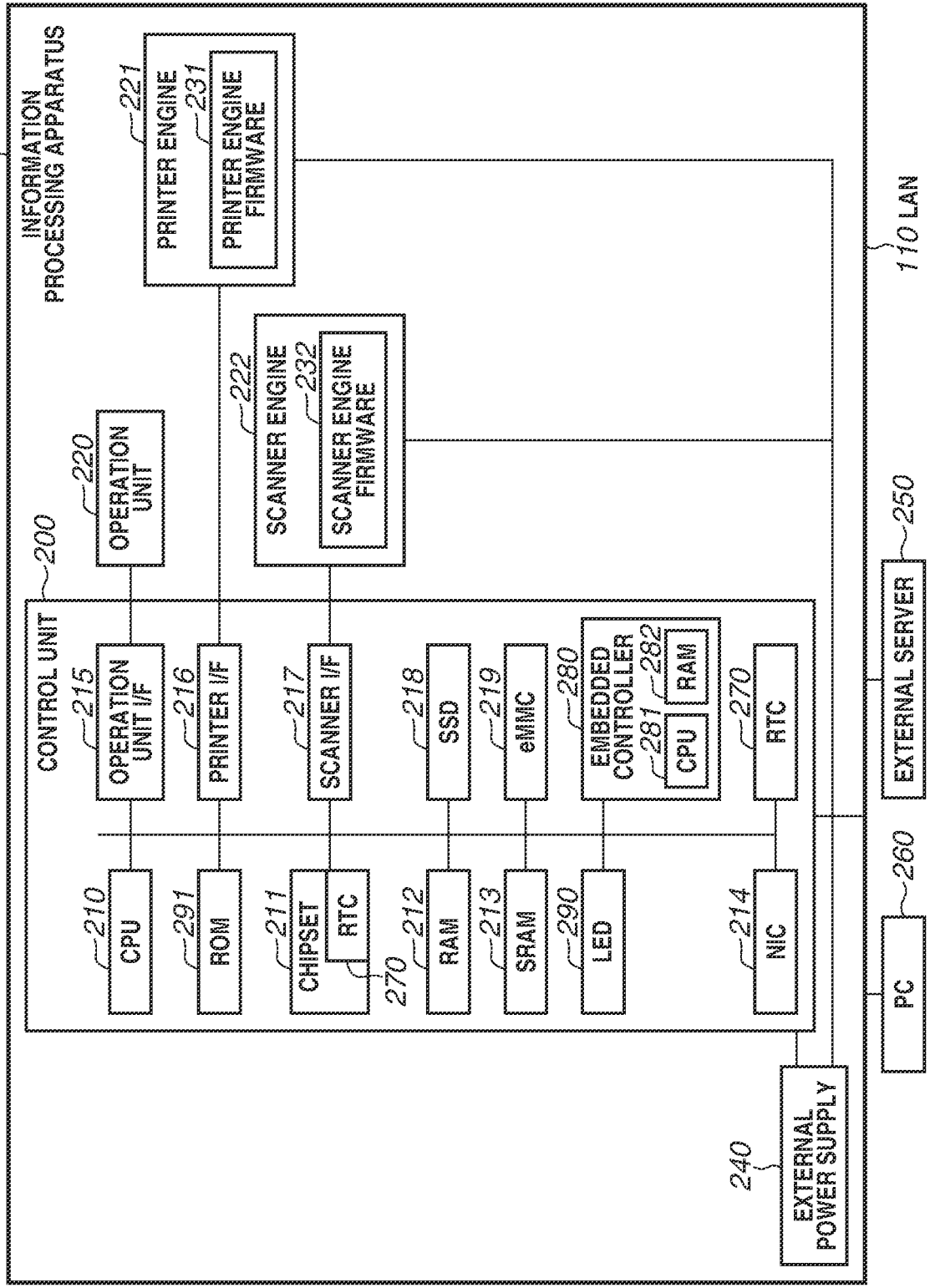
FIG. 1 is a block diagram illustrating the configuration of an information processing apparatus.

A first exemplary embodiment will be described. FIG. 1 is an exemplary hardware configuration diagram of an information processing apparatus 100.

A control unit 200 including a central processing unit (CPU) 210 controls the general operation of the information processing apparatus 100. The CPU 210 reads out control programs stored in an embedded multimedia card (eMMC) 219 that is a nonvolatile semiconductor storage device, and performs various kinds of control processing such as reading control, printing control, and firmware update control. The eMMC 219 is also used as a work area and a user data area.

A read only memory (ROM) 291 stores a basic input/output system (BIOS), fixed parameters, and the like of the information processing apparatus 100. A random access memory (RAM) 212 is used as a main memory for the CPU 210, and a temporary storage area such as a work area. A static random access memory (SRAM) 213 is a nonvolatile memory, and stores set values, image adjustment values, and the like for the information processing apparatus 100, which makes data in the SRAM 213 remain when power is turned on again. A solid state drive (SSD) 218 includes a file storage area for firmware update, and stores image data, user data, and other data.

The SSD 218 is not mounted in some cases. In this case, the file storage area for firmware update, the image data, the user data, and the other data are all stored in the eMMC 219. An operation unit interface (I/F) 215 connects an operation unit 220 and the control unit 200. The operation unit 220 is provided with a liquid crystal display unit that has a touch panel function and with a keyboard, and the like. A printer I/F 216 connects a printer engine 221 and the control unit 200. A ROM (not illustrated) included in the printer engine 221 stores printer engine firmware 231. Image data to be printed by the printer engine 221 is transferred from the control unit 200 to the printer engine 221 through the printer I/F 216, and is printed on a recording medium by the printer engine 221. A scanner I/F 217 connects a scanner engine 222 and the control unit 200. A ROM (not illustrated) included in the scanner engine 222 stores scanner engine firmware 232. The scanner engine 222 generates image data by reading an image on a document, and inputs the image data to the control unit 200 through the scanner I/F 217.

A network I/F card (NIC) 214 connects the control unit 200 (information processing apparatus 100) to a local area network (LAN) 110. The NIC 214 transmits image data and information to an external apparatus (e.g., an external server 250 and a personal computer (PC) 260) on the LAN 110, and receives update firmware and various kinds of information from the external apparatus. The external server 250 is present on the Internet in some cases. The information processing apparatus 100 is operated on a web browser (not illustrated) on the PC 260 in some cases.

A chipset 211 indicates a plurality of integrated circuits having a series of relationships. A real time clock (RTC) 270 is a chip dedicated to time counting. An external power supply 240 stops the supply of power in response to an instruction from a control program stored in the eMMC 219; however, even when the external power supply 240 is not connected, the RTC 270 can receive power supply from a built-in battery (not illustrated). Thus, the RTC 270 can operate in a sleep state.

This configuration allows waking up from the sleep state with power partially supplied to the chipset 211. In contrast, the RTC 270 cannot operate in a shutdown state without power being supplied to the chipset 211 at all. A CPU 281 runs a software program for an embedded controller 280, and performs part of the control in the information processing apparatus 100. A RAM 282 is used to store programs and temporary data when the CPU 281 controls the information processing apparatus 100. A light-emitting diode (LED) 290 emits light as appropriate and is used to notify abnormalities of software and hardware to outside.

<Partition Configuration>

Figure 2:
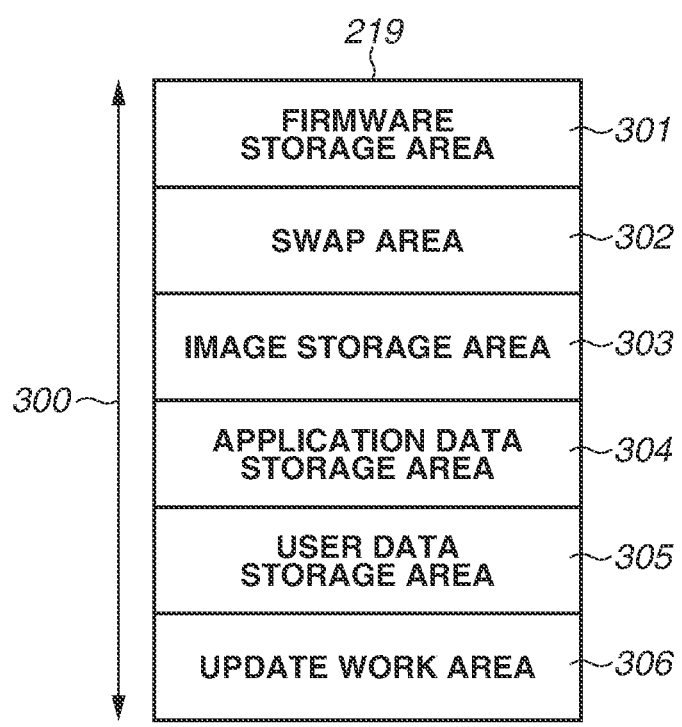
FIG. 2 illustrates an example of the partition configuration of an embedded multimedia card (eMMC).

FIG. 2 is an exemplary partition configuration diagram of a system area 300 in the eMMC 219, which is a semiconductor storage device held by the information processing apparatus 100.

A firmware storage area 301 stores software programs to be run by the CPU 210 of the control unit 200. A swap area 302 is an area to temporarily save information in the RAM 212 as a limited resource. An image storage area 303 stores data temporarily used, for example, when the information processing apparatus 100 decompresses a compressed image. An application data storage area 304 holds a usable application that is installed by a user after the information processing apparatus 100 is installed, and set values of the application. A user data storage area 305 stores set values that the user can change. An update work area 306 is used when a software program stored in the firmware storage area 301 is updated, for example, as a work area to hold backup data for rollback if an error occurs during the update.

FIG. 3 illustrates the configuration of controller software 330 that is run by the control unit 200 of the information processing apparatus 100 and controls the whole of the information processing apparatus 100.

The controller software 330 includes a controller application portion that carries out engine control unique for the information processing apparatus 100, image processing, and job control, and an operating system (OS) 380. The controller software 330 is run by the CPU 210.

The OS 380 controls the kernel as the core of system control and various kinds of hardware, and provides various kinds of basic services to the controller software 330. The OS 380 includes a file system processing unit 381, a block device processing unit 382 that performs abstracted processing on a device accessible in units of blocks, and a device driver 383 that performs control specific to each device.

An eMMC host controller 384 included in the device driver 383 is a device driver transmitting commands to the eMMC 219. The eMMC host controller 384 performs initialization for the eMMC 219 detected when the OS 380 is initialized. At this time, the eMMC host controller 384 determines an initial discard size 390 as a discard size for one time transmission processing to the eMMC 219 is performed, based on the setting of TRIM_MULT held in an EXTCSD area of the eMMC 219. Further, the RAM 212 holds the determined initial discard size 390. The discard size is a size (the size of processing area) where discard processing is performed. The discard processing is processing to notify the controller of the semiconductor storage device of an area no longer in use by a discard command.

On the other hand, an overwrite discard size 391 can be set from an application through, for example, a pseudo file system procfs of Linux Kernel. When receiving a setting of the overwrite discard size 391 from the application, the eMMC host controller 384 sets an overwrite flag 392. The overwrite discard size 391 and the overwrite flag 392 are both held in the RAM 212.

If a request leading to the discard command is received from the application, the eMMC host controller 384 refers to the overwrite flag 392. If the overwrite flag 392 is set, the eMMC host controller 384 sets the overwrite discard size 391 as the discard size, and clears the overwrite flag 392. As an exception, if the overwrite discard size 391 is zero, the eMMC host controller 384 sets the initial discard size 390 as the discard size, and clears the overwrite flag 392.

In other words, if the overwrite discard size 391 is set to zero by the application, the eMMC host controller 384 uses the initial discard size 390 at the next discard request. The eMMC host controller 384 receives a request for file system generation processing, inspection/repair processing, swap area validation processing, and trim processing from the application through the file system processing unit 381 and the block device processing unit 382. Further, the eMMC host controller 384 transmits a discard command to the eMMC 219 to cause the eMMC 219 to perform the trim processing. When the eMMC 219 completes the processing of the discard command, the eMMC host controller 384 responds to the application as a request source through the file system processing unit 381 and the block device processing unit 382.

A mount application 350 mounts the partitions of the system area 300 in the eMMC 219 to make the file system available for the application started up thereafter. More specifically, the mount application 350 associates the partitions of the system area 300 in the eMMC 219 detected by the OS 380 with specific directories. This enables each application to operate files without being conscious of control of the block devices such as the eMMC and the HDD, and control specific to the eMMC 219.

In addition, the mount application 350 validates the swap area 302.

Further, the mount application 350 performs file system generation processing and inspection/repair processing if the partitions have not been created or the file system is logically destroyed.

A general application 351 is an application totally providing functions to the user. In particular, an operation control application performs screen display and input reception of the operation unit 220.

A controller application programming interface (API) 360 is an API layer that performs control reception of the whole of the information processing apparatus 100 and performs state notification to outside. The controller API 360 receives an operation instruction from an application layer in the upper layer, and instructs operation of a job and a device control module in the lower layer. Further, the controller API 360 performs notification of state change generated from a job and a device in the lower layer.

A device control application 352 receives a device operation request from each application, and operates various kinds of hardware through the device driver 383. For example, the device control application 352 receives an operation unit display request from the operation control application, and controls the operation unit 220. If a copy job is generated, the device control application 352 instructs operation of the scanner engine 222 and the printer engine 221 through the device driver 383.

A power control application 353 performs various kinds of power control.

<Outline of Startup Processing>

When a power switch belonging to the external power supply 240 is turned on, the supply of power is started, and the CPU 210 starts startup processing. The CPU 210 starts up the printer engine 221 and the scanner engine 222. Thereafter, the CPU 210 sequentially starts up the control programs. At the beginning of the startup, the CPU 210 starts up the mount application 350, and sets up the partitions and the file system of the system area 300 in the eMMC 219. More specifically, for example, if the partitions are not created at assembly in a factory, the eMMC 219 creates the partitions and generates the file system. Further, if a startup failure occurs due to logical destruction of the file system and a service engineer requests generation or inspection/repair of the file system, the CPU 210 perform generation processing or inspection/repair processing. The swap area 302 is validated at the startup at all times, irrespective of any condition.

Before start of the setup of the partitions and the file system of the system area 300, the mount application 350 sets the overwrite discard size 391 greater than the initial discard size 390. After the completion of the setup, the mount application 350 sets the overwrite discard size 391 to zero. During the startup processing, a user interface (UI) control application displays content that the startup processing is under execution on the operation unit 220, for notification to the user. The mount application 350 sets the discard size, thereby causing the eMMC host controller 384 to set the overwrite discard size 391.

<Outline of Shutdown Processing>

When the power switch belonging to the external power supply 240 monitored by the CPU 210 is turned off, the power control application 353 receives notification through the device driver 383, and starts shutdown processing. The power control application 353 outputs an end request to various kinds of applications, and requests the device control application 352 to stop the power supply to the hardware represented by the printer engine 221 and the scanner engine 222.

When the switch belonging to the external power supply 240 is turned off, the CPU 210 starts the shutdown processing, and displays content that the shutdown processing is under execution on the operation unit 220, for notification to the user. Further, the CPU 210 ends all of the jobs controlled by the control unit 200, and stops the printer engine 221 and the scanner engine 222. Further, the CPU 210 causes the eMMC 219 to perform the trim processing to discard unused areas of the eMMC 219.

More specifically, before the OS 380 causes the eMMC 219 to start the trim processing, the power control application 353 sets the overwrite discard size 391 greater than the initial discard size 390. The power control application 353 sets the discard size, thereby causing the eMMC host controller 384 to set the overwrite discard size 391. Further, the eMMC host controller 384 causes the eMMC 219 to perform the trim processing.

After the trim processing is completed, the overwrite discard size 391 is set to zero. Thereafter, the CPU 210 writes content of the cache held in the RAM 212, in the eMMC 219, clears the connection with the eMMC 219, and ends all of the control programs. Further, after the CPU 210 completes the shutdown processing in the above-described manner, the supply of power is stopped.

FIG. 4 is a control flowchart of eMMC detection and overwrite discard size setting by the CPU 210 at startup.

In step S401, the eMMC host controller 384 clears the overwrite flag 392 used when the discard size is overwritten, and initializes the overwrite discard size to zero.

In step S402, the eMMC host controller 384 detects the eMMC 219. Further, the eMMC host controller 384 calculates the initial discard size 390 as the discard size for one time transmission processing to the eMMC 219 is performed, based on the setting of TRIM_MULT held in the EXTCSD area of the eMMC 219.

In step S403, the eMMC host controller 384 waits for a setting request of the overwrite discard size 391 from the application through procfs of the OS 380. If the eMMC host controller 384 receives a setting request of the overwrite discard size 391 (YES in step S403), the processing proceeds to step S404.

In step S404, the OS 380 sets the overwrite flag, and sets the overwrite discard size 391 to the size designated in step S403. In step S405, the OS 380 waits for turning off of the power supply.

If the power supply is not turned off (NO in step S405), the OS 380 can wait for the next setting request of the overwrite discard size 391 in step S403.

FIG. 5 is a control flowchart by the CPU 210 when discard is requested from the application.

In step S501, the eMMC host controller 384 waits for a discard request from the application. In step S502, the eMMC host controller 384 checks whether the overwrite flag is set.

If the result in step S502 is YES (YES in step S502), the eMMC host controller 384 determines that the setting of the overwrite discard size 391 has been requested from the application, and the processing proceeds to step S503. Otherwise (NO in step S502), the eMMC host controller 384 determines that the setting of the overwrite discard size 391 has not been requested from the application, and the processing proceeds to step S507.

In step S503, the eMMC host controller 384 clears the overwrite flag 392. With this control, when the discard command is executed a plurality of times in response to the discard request from the application, the discard size is avoided from being set to the same size many times.

In step S504, the eMMC host controller 384 checks whether the overwrite discard size 391 is greater than zero.

If the result in step S504 is YES (YES in step S504), the eMMC host controller 384 sets the discard size to the overwrite discard size 391 in step S505. Otherwise (NO in step S504), the eMMC host controller 384 sets the discard size to the initial discard size 390 in step S506.

In step S507, the eMMC host controller 384 executes the discard command. In other words, the eMMC host controller 384 transmits the discard command to the eMMC 219.

FIG. 6 is a sequence diagram illustrating an operation example of the information processing apparatus 100, and illustrates operation examples in four phases of device detection at startup, partition and file system setup at startup, apparatus normal operation, and shutdown.

In the device detection phase, in step 601, the CPU 210 detects the eMMC 219, and the eMMC host controller 384 calculates and sets the initial discard size 390 as the discard size.

The partition and file setup phase including steps 611 to 619 illustrates an example in which the mount application 350 requests discard.

In steps 611 and 612, the mount application 350 issues size setting notification (size setting request) to set the overwrite discard size 391 greater than the initial discard size 390, to the OS 380 through procfs.

In step 613, the mount application 350 requests the file system processing unit 381 to perform generation of the file system (mkfs), inspection/repair (fsck), and validation of the swap area 302 (swapon). The request processing of mkfs, fsck, and swapon each include discard processing.

In step 614, the file system processing unit 381 requests the eMMC host controller 384 to perform actual processing of generation of the file system (mkfs), inspection/repair (fsck), and validation of the swap area 302 (swapon).

In step 615, the eMMC host controller 384 clears the overwrite flag 392, and sets the discard size to the overwrite discard size 391.

In step 616, the eMMC host controller 384 transmits the discard command (execution instruction of discard processing) to the eMMC 219. The discard command includes the set discard size.

In step 617, the eMMC host controller 384 transmits a read command and a write command relating to mkfs, fsck, and swapon (execution instruction processing other than discard processing). The processing fsck is a request for the partition inspection and repair through the file system included in the OS. The processing mkfs is a request for the partition format processing to the eMMC 219. The processing swapon is a request for the validation processing of the swap area 302.

In steps 618 and 619, the mount application 350 causes the OS 380 to set the overwrite discard size 391 to zero with the size initialization notification (initial size setting request) through procfs.

The apparatus normal operation phase including steps 621 to 625 illustrates an example in which the general application 351 requests discard.

In step 621, the general application 351 requests the file system processing unit 381 to perform processing including discard on the eMMC 219.

In step 622, the file system processing unit 381 requests the eMMC host controller 384 to perform actual processing of the requested processing.

In step 623, the eMMC host controller 384 clears the overwrite flag 392, and sets the discard size to the initial discard size 390.

In step 624, the eMMC host controller 384 transmits the discard command to the eMMC 219. The discard command includes the set initial discard size.

In step 625, the eMMC host controller 384 transmits a read command and a write command relating to the processing other than the discard processing, to the eMMC 219.

The shutdown phase including steps 631 to 639 illustrates an example in which the power control application 353 requests discard.

In steps 631 and 632, the power control application 353 requests the OS 380 to set the overwrite discard size 391 greater than the initial discard size 390 through procfs.

In step 633, the power control application 353 requests the file system processing unit 381 to perform the trim processing (fstrim) on the eMMC 219 through OS 380.

In step 634, the file system processing unit 381 requests the eMMC host controller 384 to perform actual processing of the trim processing.

In step 635, the eMMC host controller 384 clears the overwrite flag 392, and sets the discard size to the overwrite discard size 391.

In step 636, the eMMC host controller 384 transmits the discard command to the eMMC 219. The discard command includes the set discard size.

In step 637, the eMMC host controller 384 transmits a read command and a write command relating to the processing other than the discard processing of the trim processing, to the eMMC 219.

In steps 638 and 639, the mount application 350 causes the OS 380 to set the overwrite discard size 391 to zero through procfs.

The above-described configuration according to the present exemplary embodiment makes it possible to make a discard request of the area size corresponding to the operation state of the application. For example, if the application changes the discard size as appropriate, high-speed discard is provided at startup or shutdown, in which a user cannot perform operation and a job cannot be received. In contrast, during normal operation, in which a user can perform operation and a job can be received, a setting can be maintained of not prolonging an I/O waiting time caused by a discard request from a certain application. This provides convenience for the user.

A second exemplary embodiment will be described. In the first exemplary embodiment, the example in which the application sets the overwrite discard size 391 is described. In the second exemplary embodiment, an example in which the discard size 391 is set by the OS 380 in response to a discard request from an application or based on the type of the application as a transmission source.

FIG. 7 is a control flowchart by the CPU 210 when the eMMC detection is performed at startup and discard is requested from the application.

In step S701, the eMMC host controller 384 detects the eMMC 219. The eMMC host controller 384 calculates the initial discard size 390 as the discard size for one time transmission processing to the eMMC 219 is performed, based on the setting of TRIM_MULT held in the EXTCSD area of the eMMC 219.

In step S702, the eMMC host controller 384 waits for the discard request from the application. Next, in step S703, the eMMC host controller 384 checks whether the discard request indicates generation of the file system (mkfs). The actual check is unable to be performed by the programs in the OS 380. Thus, the CPU 210 performs the determination based on a prescribed size in the mkfs program called by the application. If the result is YES (YES in step S703), the processing proceeds to step S708. Otherwise (NO in step S703), the processing proceeds to step S704, and the eMMC host controller 384 checks the type of the request.

In step S704, the eMMC host controller 384 checks whether the discard request indicates inspection/repair of the file system (fsck). The actual check is unable to be performed by the programs in the OS 380. Thus, the CPU 210 performs the determination based on a prescribed size in the fsck program called by the application. If the result is YES (YES in step S704), the processing proceeds to step S708.

If the result is NO (NO in step S704), the processing proceeds to step S705, and the type of the request is checked.

In step S705, the eMMC host controller 384 checks whether the discard request indicates validation of the swap area 302 (swapon). More specifically, the file system processing unit 381 performs the determination based on, for example, the portion where the discard request for the swap area is received. If the result is YES (YES in step S705), the processing proceeds to step S708. Otherwise (NO in step S705), the processing proceeds to step S706, and the type of the request is checked.

In step S706, the eMMC host controller 384 checks whether the discard request indicates the trim processing to the eMMC 219. More specifically, the eMMC host controller 384 performs the determination based on, for example, the portion where IOCTL of FITRIM executed from the fstrim command is received. If the result is YES (YES in step S706), the processing proceeds to step S708. Otherwise (NO in step S706), the processing proceeds to step S707.

In step S707, the eMMC host controller 384 sets the discard size to the initial discard size 390. In step S708, the eMMC host controller 384 sets the discard size to the predetermined overwrite discard size 391. In step S709, the eMMC host controller 384 executes the discard command. In other words, the eMMC host controller 384 transmits the discard command to the eMMC 219.

FIG. 8 is a sequence diagram illustrating an operation example of the information processing apparatus 100, and illustrates operation examples in four phases of device detection at startup, partition and file system setup at startup, apparatus normal operation, and shutdown.

In the device detection phase, in step 801, the CPU 210 detects the eMMC 219, and the eMMC host controller 384 calculates the initial discard size 390 and sets the initial discard size 390 as the discard size.

The partition and file system setup phase including steps 811 to 816 illustrates an example in which the mount application 350 requests discard.

In step 811, the mount application 350 requests the file system processing unit 381 to perform generation of the file system (mkfs), inspection/repair (fsck), and validation of the swap area 302 (swapon).

In step 812, the file system processing unit 381 requests the eMMC host controller 384 to set the overwrite discard size 391 greater than the initial discard size 390.

In step S813, the eMMC host controller 384 clears the overwrite flag 392, and sets the discard size to the overwrite discard size 391. The discard command includes the set discard size.

In step 814, the file system processing unit 381 requests the eMMC host controller 384 to perform actual processing of generation of the file system (mkfs), inspection/repair (fsck), and validation of the swap area 302 (swapon).

In step 815, the eMMC host controller 384 transmits the discard command to the eMMC 219.

In step 816, the eMMC host controller 384 transmits a read command and a write command relating to generation of the file system (mkfs), inspection/repair (fsck), and validation of the swap area 302 (swapon), to the eMMC 219.

The apparatus normal operation phase including steps 821 to 826 illustrates an example in which the general application 351 requests discard.

In step 821, the general application 351 requests the file system processing unit 381 to perform processing including discard on the eMMC 219.

In step 822, the file system processing unit 381 requests the eMMC host controller 384 to set the initial discard size 390.

In step 823, the eMMC host controller 384 clears the overwrite flag 392, and sets the discard size to the initial discard size 390.

In step 824, the file system processing unit 381 requests the eMMC host controller 384 to perform actual processing of the processing including discard.

In step 825, the eMMC host controller 384 transmits the discard command to the eMMC 219. The discard command includes the set initial discard size.

In step 826, the eMMC host controller 384 transmits a read command and a write command relating to the processing including discard, to the eMMC 219.

The shutdown phase including steps 831 to 836 illustrates an example in which the power control application 353 requests discard.

In step 831, the power control application 353 requests the file system processing unit 381 to perform the trim processing (fstrim).

In step 832, the file system processing unit 381 requests the eMMC host controller 384 to set the overwrite discard size 391 greater than the initial discard size 390.

In step 833, the eMMC host controller 384 clears the overwrite flag 392, and sets the discard size to the overwrite discard size 931.

In step 834, the file system processing unit 381 requests the eMMC host controller 384 to perform actual processing of the trim processing.

In step 835, the eMMC host controller 384 transmits the discard command to the eMMC 219. The discard command includes the set discard size.

In step 836, the eMMC host controller 384 transmits a read command and a write command relating to processing other than the discard processing of the trim processing, to the eMMC 219.

The above-described configuration in the present exemplary embodiment also makes it possible to perform a discard request of the area size corresponding to the operation state of the application. For example, when the OS changes the discard size as appropriate, high-speed discard processing is provided during format and inspection/repair of the file system, validation of the swap area, and the trim processing. In contrast, during the normal operation, in which a user can perform operation and a job can be received, a setting can be maintained of not prolonging an I/O waiting time caused by a discard request from a certain application. This provides convenience for the user.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc™ (BD)), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-200577, filed Dec. 10, 2021, which is hereby incorporated by reference herein in its entirety.

What is claimed is:

1. An apparatus including a storage, the apparatus comprising a controller configured to run a system that transmits a request to the storage, and a plurality of applications stored in the storage that each transmit, to the system, a request including at least discard processing for notifying the storage of an area no longer in use in at least the storage,
wherein, in response to when the system receives the request including at least the discard processing from any of the plurality of applications, the controller sets a size of a processing area processed by the discard processing, and then transmits an instruction of the discard processing, to the storage, and
wherein a first size set in a case where a first request including at least the discard processing is received from a first application is wider than a second size set in a case where a second request including at least the discard processing is received from a second application different from the first application.

2. The apparatus according to claim 1, wherein the controller transmits, to the system, a size setting request designating a size of the processing area processed by the discard processing in the first application, and wherein the system sets the size of the processing area processed by the discard processing based on the first size included in the size setting request.

3. The apparatus according to claim 1, wherein, in the system, the controller determines the size of the processing area processed by the discard processing based on a type of an application as a transmission source of the request including at least the discard processing, and sets the determined size as the size of the processing area processed by the discard processing.

4. The apparatus according to claim 1, wherein the second size is an initial size previously stored in the system.

5. The apparatus according to claim 1, wherein the first application includes a power control application that performs power control of the apparatus.

6. The apparatus according to claim 5, wherein, in a case where the first application is the power control application, the request including at least the discard processing, transmitted from the first application to the system, is a request for trim processing.

7. The apparatus according to claim 5, wherein the power control application transmits, to the system, the request including at least the discard processing at shutdown of the apparatus.

8. The apparatus according to claim 1, wherein the first application includes a mount application that mounts partitions of the storage.

9. The apparatus according to claim 8, wherein, in a case where the first application is the mount application, the request including at least the discard processing is a request for partition format processing through a file system included in the system.

10. The apparatus according to claim 8, wherein, in a case where the first application is the mount application, the request including at least the discard processing is a request for partition inspection and repair through a file system included in the system.

11. The apparatus according to claim 8, wherein the mount application transmits, to the system, the request including at least the discard processing at startup of the apparatus.

12. The apparatus according to claim 1, wherein the second application includes an operation control application.

13. The apparatus according to claim 12, wherein, in a case where the second application constitutes the operation control application, the request including at least the discard processing is a request for execution of the discard processing.

14. The apparatus according to claim 1, wherein, after the system receives the request including at least the discard processing from any of the plurality of applications and transmits an instruction of the discard processing, the system transmits, to the storage, an instruction of processing except for the discard processing in the request received from any of the plurality of applications.

15. The apparatus according to claim 1, further comprising at least one processor configured to run the system and the plurality of applications.

16. A non-transitory storage medium storing a control program for an apparatus, the apparatus including a storage and a controller configured to run a system that transmits a request to the storage and a plurality of applications stored in the storage that each transmit, to the system, a request including at least discard processing for notifying the storage of an area no longer in use in at least the storage, wherein, in response to when the controller receives the request including at least the discard processing from any of the plurality of applications while running the system, the controller sets a size of a processing area processed by the discard processing, and then transmits an instruction of the discard processing, to the storage, and wherein a first size set in a case where a first request including at least the discard processing is received from a first application is wider than a second size set in a case where a second request including at least the discard processing is received from a second application different from the first application.

17. The non-transitory storage medium according to claim 16,
wherein the controller transmits, to the system, a size setting request designating a size of the processing area processed by the discard processing in the first application, and
wherein the system sets the size of the processing area processed by the discard processing based on the first size included in the size setting request.

18. The non-transitory storage medium according to claim 16, wherein, in the system, the controller determines the size of the processing area processed by the discard processing based on a type of an application as a transmission source of the request including at least the discard processing, and sets the determined size as the size of the processing area processed by the discard processing.

19. The non-transitory storage medium according to claim 16, wherein the second size is an initial size previously stored in the system.

20. The non-transitory storage medium according to claim 16, wherein the first application includes a power control application that performs power control of the apparatus.

* * * * *